3 Sheets—Sheet 1.

K. M. JARVIS.
SMOKE AND GAS CONSUMING FURNACE.

No. 186,734. Patented Jan. 30, 1877.

Witnesses.
L. H. Latimer
W. J. Pratt

Inventor
Kingsbury M. Jarvis.
per Crosby & Gregory
Att'ys

K. M. JARVIS.
SMOKE AND GAS CONSUMING FURNACE.
No. 186,734. Patented Jan. 30, 1877.
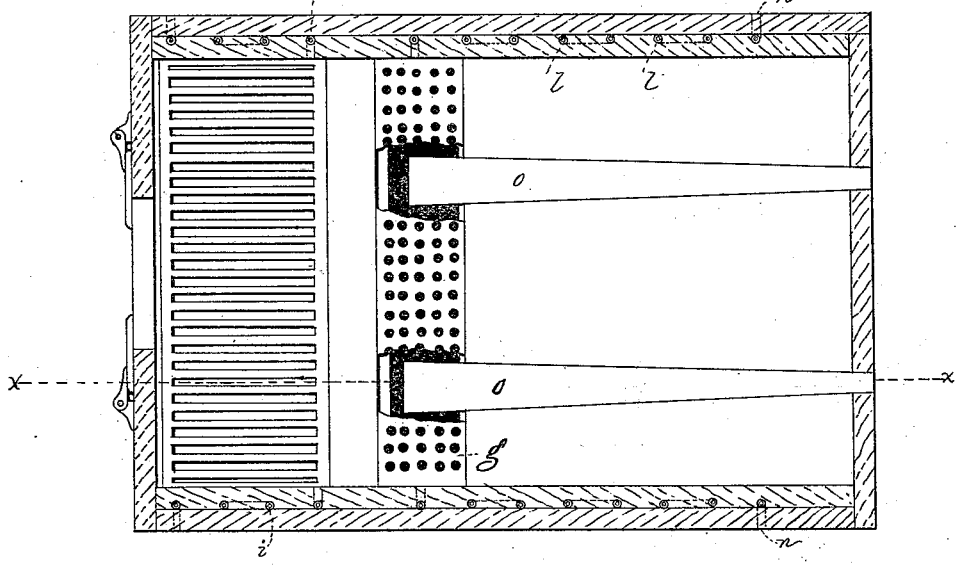
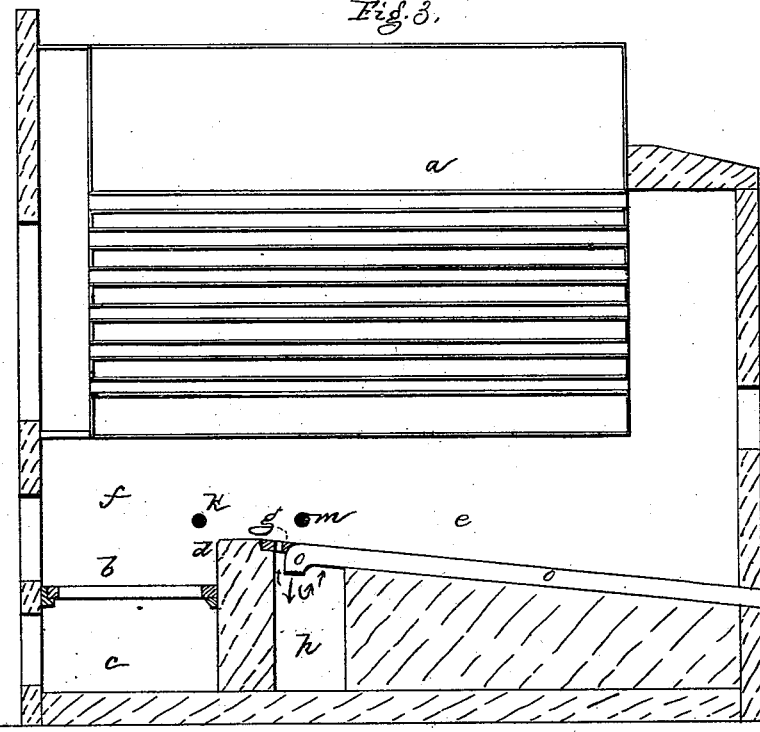

3 Sheets—Sheet 3.

K. M. JARVIS.
SMOKE AND GAS CONSUMING FURNACE.

No. 186,734. Patented Jan. 30, 1877.

Witnesses
L. H. Latimer
W. J. Pratt.

Inventor:
Kingsbury M. Jarvis.
per Crosby & Gregory
Atty s.

UNITED STATES PATENT OFFICE.

KINGSBURY M. JARVIS, OF PEABODY, MASSACHUSETTS, ASSIGNOR TO HIMSELF AND ALBERT F. UPTON, OF SAME PLACE.

IMPROVEMENT IN SMOKE AND GAS CONSUMING FURNACES.

Specification forming part of Letters Patent No. 186,734, dated January 30, 1877; application filed October 30, 1876.

*To all whom it may concern:*

Be it known that I, KINGSBURY M. JARVIS, of Peabody, in the county of Essex and State of Massachusetts, have invented an Improvement in Smoke and Gas Consuming Furnaces, of which the following is a specification:

This invention relates to gas-consuming furnaces of steam-boilers, and is an improvement on United States Patent No. 176,639, heretofore granted to me, and to which reference may be had. That patent described an arrangement of flues in the side walls of the fire-chamber and pipes or flues in the floor of the combustion-chamber, all for the introduction of oxygen in the form of hot air, in sufficient quantities to mix with the carbonic oxide, to complete the combustion of the volatile products rising from the incandescent fuel upon the grate-bars, and passing over the bridge-wall, the hot air, at an elevated temperature, commingling with the volatile gases without materially cooling them, thereby reducing their temperature and wasting heat.

In this improvement the side walls of the combustion-chamber are also provided with flues for the introduction of heated atmospheric air, such flues and the pipes in the bottom of the combustion-chamber being made larger at their air-delivering ends than they are at their receiving ends, the air heated in its passage through the pipes being allowed to expand without choking the pipe, thereby greatly increasing the force of the hot blast.

Figure 1:
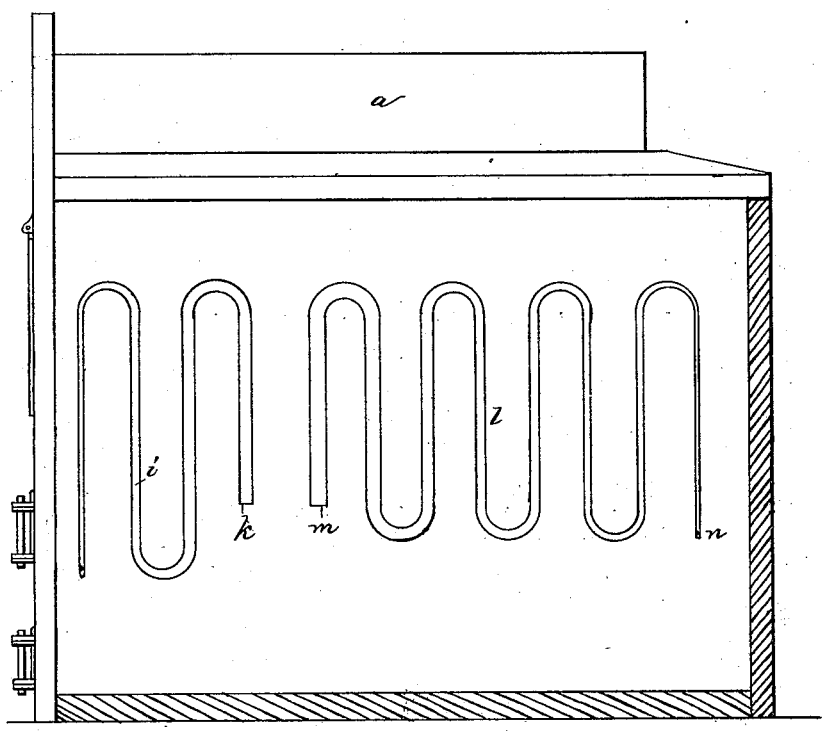
Figure 4:
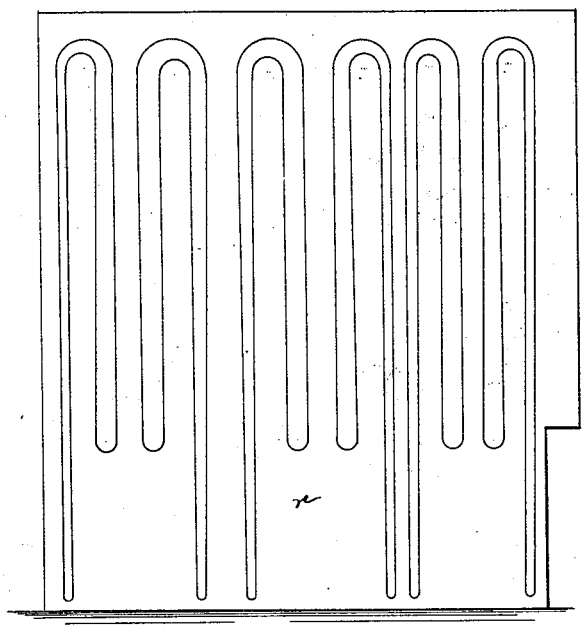

Figure 1 represents a vertical section of the side wall of a stationary furnace, showing the arrangement of flues in the wall opposite the fire-box and combustion-chambers. Fig. 2 represents a horizontal section above the bridge wall, the perforated plate being broken away. Fig. 3 represents a vertical section of the boiler and furnace. Fig. 4 represents a section of the outside wall of an upright boiler, and Fig. 5 a vertical section of part of a vertical-boiler furnace.

The boiler *a*, grate-bars *b*, ash-pit *c*, bridge-wall *d*, combustion-chamber *e*, furnace fire-chamber *f*, perforated plate *g*, and chamber *h* are as described in such patent. The flues *i* in the wall of the furnace fire-chamber receive air, which, heated as described in such patent, is discharged at opening *k*, at or near the bridge-wall. Other similar flues, *l*, in the side walls forming the combustion-chamber, receive air at or near the back of the wall at *n*, and discharge it at *m* over the perforated plate *g*, in a heated state. The addition of the flues *l* enables me to utilize the entire walls of the furnace for the purpose of heating a larger quantity of air to be discharged into and intimately mixed with the gases generated by the burning fuel, thereby adding to the efficiency of the furnace as to its qualities for thorough combustion.

In the patent referred to, the flues in the wall of the fire-chamber and the pipes for conducting air from the back of the furnace into the chamber under the perforated plate were of uniform diameter; but owing to the expansion of the air passing through such pipes, the quantity of oxygen which they otherwise would have discharged was lessened, and they failed to furnish heated air in sufficient volume for thorough combustion, and with the desired force.

In this present invention I have made these flues *i l* and pipes *o* to taper or increase in size toward their delivering ends, to provide for the expansion of the heated air passing through them, the degree of enlargement being made to correspond with the degree of heat and the corresponding expansion of the air. The air heated in the flues and pipes, being given room in which to expand, does not choke the pipes or lessen the supply of oxygen; but, on the contrary, the velocity of the current of air so heated and expanded is increased, and is supplied to the gases to be consumed with greater force and in larger quantities than before usual; and expanded and heated, such air does not cool the gases, but readily commingles with them at substantially a degree of heat suitable for immediate ignition or combustion. With a boiler of, say, one-hundred-horse power, the grate will be placed at about thirty inches below the boiler, the top of the bridge-wall about fourteen inches, and the back portion of the boiler about twenty-four inches, above the floor, these distances affording sufficient space for the thorough combustion of the combined gases and heated air.

By this construction I am enabled to burn coal, pressed tan, screenings, or any kind of fuel with good results. The air containing oxygen at an elevated temperature is thoroughly commingled with the gases passing over the bridge-wall into the combustion-chamber, where the space is large enough to permit the introduction and incorporation with the gases of a sufficient volume of heated air to furnish sufficient oxygen at an elevated temperature to unite with the carbonic oxide and substantially complete perfect combustion. The upper surfaces of the pipes $o$ are acted upon by the heated products of combustion in the combustion-chamber, and the air in the pipes is discharged into the chamber $h$.

Figure 5:
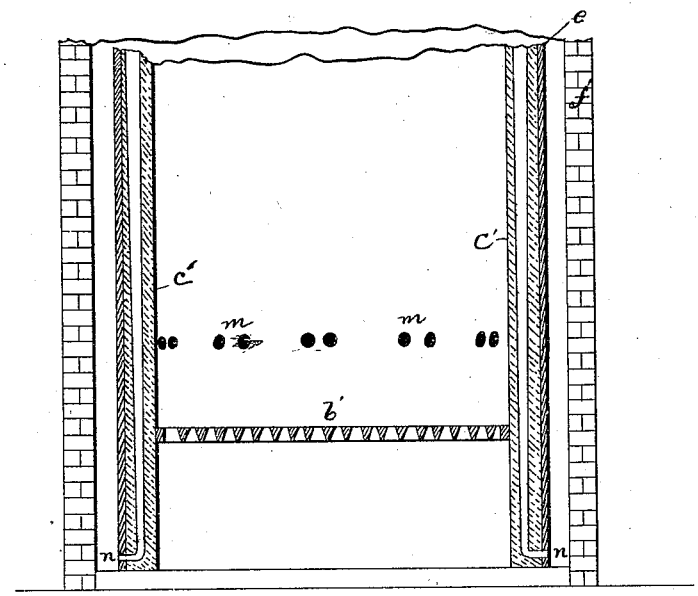

In Fig. 5 I have shown the invention embodied in a vertical boiler. The grate $b'$ is surrounded, as usual, with a fire-brick wall, $c'$, forming the combustion-chamber. To form flues in this wall I place pipes therein, as shown, each pipe communicating at one end with the atmosphere, (or it may be with an airspace between the outer wall and boiler-shell,) and at the other or enlarged end such pipes discharge air into the fire-box above the incandescent material in the combustion-chamber, such discharge-openings $m$ being usually from twelve to fifteen inches above the grate. In practice these flues will each be composed of two members or loops, instead of several members or loops.

Instead of pipes for flues, I may form the fire-bricks with air-passages and build them into the wall, the communicating openings in the bricks forming flues.

In Fig. 5 the inlets are marked $n$, and the discharge-openings $m$. The line $e'$ indicates a continuation of the boiler-shell, and $f'$ an outer wall or casing.

Fig. 4 represents the outer wall of a vertical boiler broken away to show an arrangement of hot-air-conducting pipes therein. This wall $r$ will be built immediately outside the metallic boiler-shell $e'$, (shown in Fig. 5,) and preferably directly against it, so as to be heated by radiation from the shell. These pipes are arranged as double loops, receiving air at their lower ends opened to the atmosphere, and discharging it heated at from twelve to fifteen inches above the fuel in the fire-chamber.

In Fig. 2 it will be noticed that the flame-bed above the tapering pipes $o$ is gradually inclined from the bridge-wall and pitch downward, thereby gradually increasing the area of the space forming the combustion-chamber $e$. This gradually-enlarging space greatly aids in facilitating the combustion of the volatile products of combustion, and permits the introduction of a larger amount of hot air than were the flame-bed horizontal, and, being an enlarged space, the draft is increased.

In some instances I may place the flues or pipes $i\ l$ in the walls in a horizontal position, as in Fig. 4 of my patent referred to.

I claim—

1. The combination, with the chamber $h$, of the tapering pipes $o$, arranged in the flame-bed, and adapted to heat and permit the expansion of the air passing through the pipes into the chamber, substantially as described.

2. The flues in the wall of the fire-chamber and the flues $l$ in the side walls of the combustion-chamber, both adapted to discharge hot air at or near the bridge-wall, in combination with the downwardly and backwardly inclined flame-bed, substantially as described.

3. The combination, with the fire-chamber and its encompassing-wall, of flues communicating with the atmosphere, and increasing in area at their air-delivering ends, all arranged in the side walls in position to be heated, and to discharge a volume of heated and expanded air containing oxygen into the gases liberated from the incandescent material in the combustion-chamber, substantially as and for the purpose described.

4. The downwardly and backwardly inclined flame-bed, in combination with tapering pipes $o$, arranged in the flame-bed to be heated, as described, and to permit the introduction of heated air into the combustion-chamber and the combustion of the gases in the gradually-enlarged combustion-chamber $e$, substantially as described.

In testimony whereof I have signed my name to this specification in the presence of two subscribing witnesses.

KINGSBURY M. JARVIS.

Witnesses:
G. W. GREGORY,
A. F. UPTON.